June 19, 1923.

I. W. NONNEMAN

ADAPTER FOR DIESTOCKS

Filed Sept. 29, 1921

1,459,240

2 Sheets-Sheet 1

INVENTOR
Ira W. Nonneman,
BY
ATTORNEYS

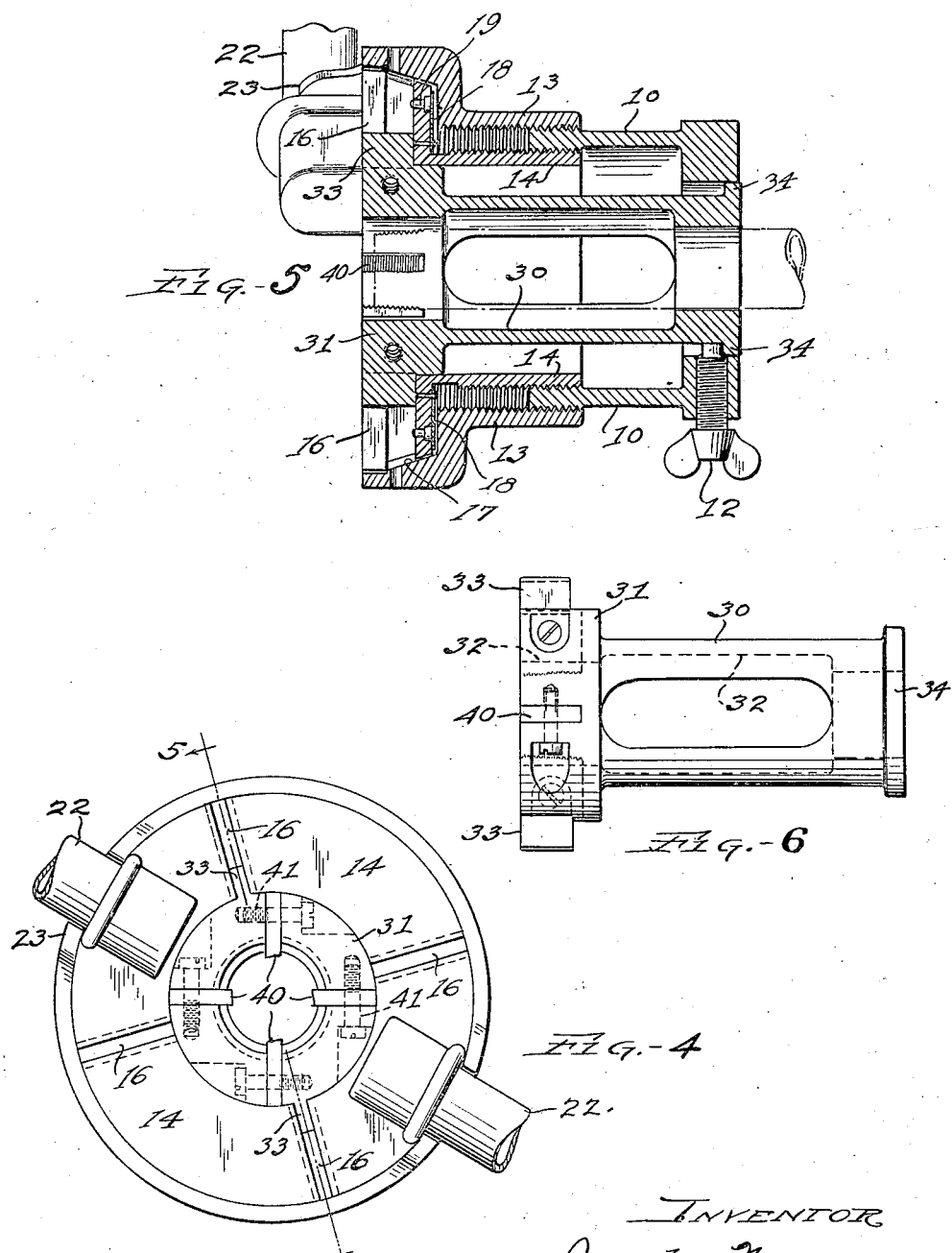

Patented June 19, 1923.                                                          1,459,240

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

ADAPTER FOR DIESTOCKS.

Application filed September 29, 1921. Serial No. 504,151.

*To all whom it may concern:*

Be it known that I, IRA W. NONNEMAN, a citizen of the United States, residing at Warren, in the county of Trumbull and State of Ohio, have invented a certain new and useful Improvement in Adapters for Diestocks, of which the following is a full, clear, and exact description, reference being had to the accompanying drawings.
The object of this invention is to provide a simple and cheap adapter capable of being readily inserted in a die stock to enable it to cut threads on pipes of smaller diameter than the minimum for which the die stock is designed.

Figure 1:
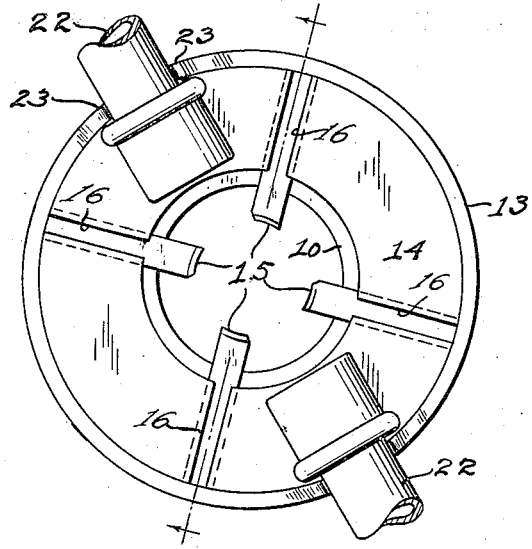
Figure 2:
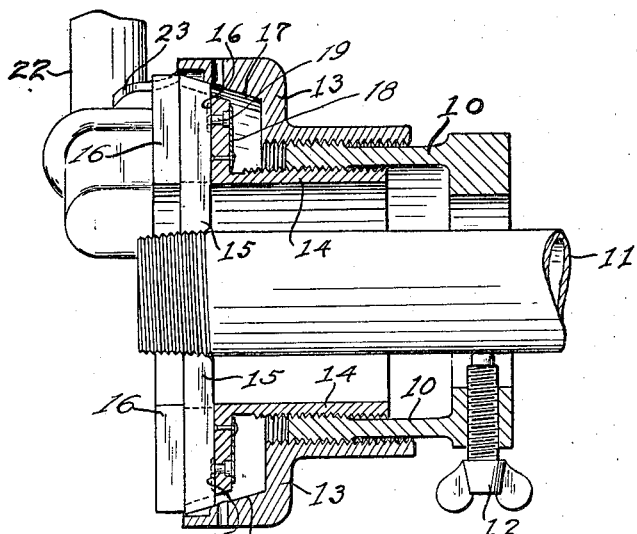
Figure 3:
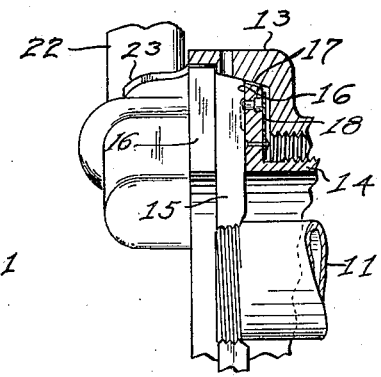

The range of pipe sizes which may be cut by a given size of die stock is quite limited, since too great an overhang of the cutting ends of the chasers cause the cutting of an inaccurate thread. Accordingly, it has been necessary to carry a number of die stocks to provide a satisfactory equipment with which to cut threads accurately on a large number of pipe sizes.
My invention, obviates the necessity of an extra die stock for smaller sizes by the provision of an adapter formed for mounting in the die stock and carrying chasers of smaller size than it is feasible to carry by the die stock itself. In this connection, I provide an adapter which can be quickly positioned within the die stock and locked into position, without in any way requiring changes in the construction of such stock.
The means for accomplishing the above objects will be more fully set forth in the following description which relates to the drawing, and the essential characteristics of my invention will be set forth in the claims.
In the drawing, Fig. 1 is a front elevation of a die stock showing a set of chasers in position prior to the reception of the adapter; Fig. 2 is a longitudinal section taken through the die stock shown in Fig. 1; Fig. 3 is a sectional fragmentary view showing the receded position of the chaser operating sleeves, as distinguished from the position shown in Fig. 2; Fig. 4 is a front elevation of the die stock shown in Fig. 1 with the adapter inserted therein; Fig. 5 is a longitudinal section taken on the line 5–5 of Fig. 4; Fig. 6 is an elevation of the adapter removed from the stock.

As my invention is concerned with the provision of means for increasing the range of pipe sizes which may be cut on any given die stock capable of receiving my adapter, the die stock shown is to be taken as illustrative of any suitable die stock. As shown, there is a stationary member 10 which is arranged to be secured to a pipe to be cut, designated 11, or to a bushing embracing the pipe, by one or more thumb screws 12. I have shown two sleeves 13 and 14, which are threaded on the exterior and interior portions respectively of the stationary member or work sleeve 10. These sleeves 13 and 14—designated also abutment and chaser sleeves—are arranged to allow a set of chasers 15 to recede from the pipe as the stock advances during the thread-cutting operation. The means for enabling the recession in the construction shown comprises threads of steeper pitch between the abutment sleeve and work sleeve than between the chaser sleeve and work sleeve, the resulting separation of the sleeves causing the conical inner periphery 17 on the abutment sleeve (which limits the outward position of the chasers carried by the chaser sleeve) to allow the chasers to move gradually outward.

The chasers 15 occupy undercut radial passages 16 in the head of the sleeve 14 and may be arranged to be retained within the head by means of individual leaf springs 18 bearing against pins 19 which bear against the chasers.

As the die stock handles 22 are rotated, the sleeves 13 and 14 rotate simultaneously, and move longitudinally of the pipe, with different velocities, corresponding to the differential pitch of the threads on the sleeve 10. A convenient means for causing simultaneous rotation, is embodied in a set of ears 23 which are carried by the sleeve 13 and arranged to partially embrace the handles 22.

The above described construction, which is shown and claimed in Patent No. 1.306,021, granted to me June 10, 1919, is a preferred form of die stock to which my invention is applicable.

With a die-stock operable in accordance with the manner above explained, the pipe sizes on which the chasers may be most efficiently used are limited by the length of overhang, between the cutting surfaces on the chasers and the point at which such chasers enter the slots in the sleeve 14. For instance, I have found that a die-stock of this character adapted for cutting threads on pipes as large as two inches in diameter is not efficient for cutting of threads on pipes under one inch in diameter. The adapter herein shown and which will now be explained is arranged to co-operate with this form of stock so as to enable the smaller sized pipes to be threaded with ease and precision.

Referring now to Figs. 4 to 6, I have shown the adapter as having a body 30 which is provided with a chaser carrying head 31, and which is hollowed in the interior, as at 32, for receiving the pipe to be cut. The exterior of the body is substantially complementary to the interior of the sleeves 10 and 14 so that one end thereof may be clamped by the thumb screw or clamping device 12, while the other end thereof is in close-fitting engagement with the sleeve 14.

To enable the die stock to drive the adapter, I employ one or more wings 33 which project radially from the head 31 in position to register with chaser slots in the sleeve 14. The thickness of these wings corresponds to the width of the narrow portion of the undercut grooves occupied by the chasers. Before inserting the adapter, all of the chasers 15 are removed from the sleeve 14. When in place, the wings abut the inner face of the die stock head, as shown in Fig. 5, and the adapter is locked in this position by the thumb screw 12 or other clamping device which engages in front of a flange 34 at the rear end of the adapter. In the form illustrated, there are two wings 33 which are positioned diametrically opposite each other on the adapter head.

The adapter head has radial slots to carry a set of chasers 40 of the non-receding type. For holding such chasers 40 in their respective slots, I employ screws 41, which extend at right angles to such chasers, and pass through them and have their heads occupying recesses cut in the periphery of the adapter head. By making the external diameters of the head 31 and flange 34 to fit snugly within the die stock barrel, it becomes in use a substantially tight part of the die stock. The internal diameter of the adapter head is selected to provide sufficient clearance in cutting, while that at the rear end is found to engage the pipe with proper closeness to provide a guide.

The cutting faces of the adapter chasers 40 have the length and are formed with the taper usual with non-receding chasers. The differential movement of the sleeves 13 and 14 is avoided when the adapter is in use by reason of the sleeve 10 being chained to the adapter and rotating with it, so that the entire die stock rotates as a unit.

The operation of my device is as follows; assuming that the chasers 15 are removed from the sleeve 14: then the adapter is inserted within the sleeve with the wings 33 occupying two of the recesses formerly occupied by the chasers, and is locked by the clamp 12. The entire device may now be rotated as a unit by the handles 22, the chasers 40 feeding themselves along the pipe and the thread being thereby cut.

From the foregoing description, it will be seen that I have provided a means for increasing the range of pipe sizes for which a given die stock is designed, without in any way affecting the precision of such threads. My invention readily converts a receiving die stock of standard size with a non-receding tool for smaller sizes. My adapters are very cheap to construct and may be readily marketed as an extra with a proper die stock or sold to users of existing die stocks for increasing the use thereof.

Having thus described my invention, I claim:—

1. In combination, an exterior frame, an interior frame, each adapted to hold separate sets of chasers, and means for holding said frames in engagement with each other, whereby rotation of one frame causes simultaneous rotation of the other.

2. In combination, two chaser carrying frames, one adapted to be mounted within the other, the exterior frame having a recess and the interior frame having a projection adapted to occupy such recess whereby rotation of the exterior frame causes simultaneous rotation of the interior frame with its chasers.

3. In a device of the class described, the combination with a die stock having a chaser carrying frame having radial chaser slots therein, of an auxiliary frame having means projecting therefrom adapted to occupy one or more of said slots, and an auxiliary set of chasers carried by said last mentioned frame.

4. In a device of the class described, the combination with a die stock comprising a chaser-carrying frame having provision for one set of chasers, of a removable member adapted to be inserted within said frame, a set of chasers carried by said member and of smaller size than those arranged to be carried by said frame and means for locking the frame and member together, whereby rotation of the frame operates the smaller set of chasers.

5. In combination, a chaser-carrying frame having radial chaser slots therein, handles carried by the frame, a removable member adapted to be inserted within said frame, one or more ears projecting therefrom and adapted to occupy such slots, and a set of chasers arranged radially within said member.

6. In a device of the character described, the combination with a chaser frame having handle sockets carried thereby, said frame having chaser slots positioned radially therein, a removable chaser-carrying member having a portion thereof complementary to the first mentioned frame, a set of chasers projecting inwardly from said member and rigidly carried thereby and radial wings carried by said member, the wings being adapted to occupy chaser slots in said frame for holding the frame and member in operative relation to each other.

7. In combination, an exterior frame and an interior frame, each having provision for a set of chasers, means carried by one of the frames for engaging the other and holding them together, the interior frame being extended lengthwise of the axis and having a guide adjacent its rear end.

8. In combination, two concentric frames, each having provision for a set of chasers, the outer frame having radial slots therein, and the inner frame having one or more external wings adapted to extend into said slots and having an inwardly extending portion adapted to engage a pipe and constitute a guide.

9. In a device of the class described, the combination with a die stock having a chaser carrying frame, said frame having radial chaser slots therein, of an auxiliary frame having means projecting therefrom and adapted to occupy one or more of said slots and having an axially extending sleeve portion carrying a pipe guide at its far end, and chasers rigidly carried by said last mentioned frame.

10. The combination with a die stock of the receding chaser type, of an adapter adapted to fit within the die stock and fixedly carry its own set of chasers, and means for securing the adapter within the die stock in such manner that it may be rotated thereby.

11. The combination, with a die stock having guide-ways adapted to receive chasers, and means adapted to control the recession of the chasers in the guideways, of an adapter adapted to fit within the die stock and having one or more ears adapted to engage one or more of the guideways of the die stock, and a set of chasers fixedily carried by the adapter.

12. The combination with a die stock having a head with radial chaser grooves therein which are open through the face of the head, and an adapter adapted to occupy the bore of the die stock and having a head fitting within the die stock head and having chasers carried by said adapter head, said adapter head having an outward projection adapted to pass into one of the chaser grooves of the die stock through the face opening thereinto.

13. The combination with a die stock having a head with radial chaser grooves therein which are T-shaped in cross section the narrower post being open through the face of the head, and an adapter having a circular head formed to fit snugly within the die stock head and having chasers rigidly carried by said adapter head, said adapter head having an outward projection adapted to pass into one of the chaser slots of the die stock through the face opening thereinto, and means for clamping the adapter to the die stock to prevent independent longitudinal movement.

14. The combination with a die stock, having grooves adapted to receive chasers, means for controlling the recession of such chasers, and a sleeve adapted to be clamped to the work, of an adapter comprising a sleeve adapted to fit within the die stock and be clamped to the work-sleeve, chasers fixedly carried by said adapter sleeve and a projection on the adapter sleeve adapted to enter one of the chaser grooves of the die stock.

15. The combination with a die stock having a chaser carrying frame, a stationary work sleeve adapted to be clamped to a pipe and means connecting the work sleeve with the chasers for controlling the recession of the latter as the die stock changes its longitudinal position with reference to the work sleeve, and an adapter adapted to fit within the die stock and carrying its own chasers and having a sleeve portion adapted to extend into the work sleeve of the die stock and means for clamping said work sleeve to said adapter.

16. A die stock of the receding chaser type having a chaser carrying frame, a work sleeve, means for clamping the sleeve in stationary position on a pipe and mechanism between the work sleeve and chasers controlling the recession of the latter and dependent upon the travel of the chaser carrying frame toward the work sleeve, combined with an adapter adapted to occupy both the chaser carrying frame and work sleeve of the die stock, said adapter having a head snugly occupying the head of the die stock and rigidly carrying a set of chasers and having at its rear end an inwardly projecting annular portion adapted to constitute a pipe guide.

17. The combination of a die stock of the receding chaser type having a chaser carrying frame, a work sleeve, means for clamping the sleeve in stationary position on a pipe and mechanism between the work sleeve and chasers controlling the recession of the latter and dependent upon the travel of the chaser carrying frame toward the work sleeve, combined with an adapter adapted to occupy both the chaser carrying frame and work sleeve of the die stock, said adapter having chasers rigidly carried thereby and having at its rear end an outward flange substantially engaging the work sleeve, said work sleeve having a clamping screw adapted to extend in front of said adapter flange.

18. The means for converting a die stock of the receding chaser type into one of the fixed chaser type comprising a sleeve having inwardly projecting chasers fixedly carried thereby, said sleeve having an outward projection adapted to enter one of the chaser slots of the die stock.

19. An adapter for die stocks consisting of a circular head, radial chasers mounted therein and fixedly carried thereby, an axial sleeve on the head and an inwardly extending annular portion at the rear end of the sleeve forming a pipe guide.

20. An adapter for die stocks consisting of a circular head, radial chasers mounted therein and fixedly carried thereby, an axial sleeve on the head, and an outward flange at the rear end of the sleeve.

21. An adapter for die stocks comprising a circular head having a central opening, chasers carried by said head, one or more wings extending outwardly from the head, a sleeve extending longitudinally of the head, an inwardly projecting pipe guide carried by the rear end of the sleeve.

22. An adapter for die stocks comprising a circular head having a central opening, radial slots in the head, chasers occupying said slots, bolts passing through the chasers and having heads seated within notches in the adapter head, one or more wings extending outwardly from the head, a sleeve extending longitudinally of the head, an inwardly projecting pipe guide carried by the rear end of the sleeve, and an outward flange carried by such rear end.

In testimony whereof, I hereunto affix my signature.

IRA W. NONNEMAN.